March 3, 1931.  F. SMITH  1,795,184

GLARE SHADE

Filed Jan. 5, 1928

Inventor:
Francis Smith.
by Lloyd C Bush
His Attorney.

Patented Mar. 3, 1931

1,795,184

UNITED STATES PATENT OFFICE

FRANCIS SMITH, OF SCHENECTADY, NEW YORK

GLARE SHADE

Application filed January 5, 1928. Serial No. 244,708.

My invention relates to improvements in glare shades of the type comprising a ray-filter or screen of colored glass or celluloid, which is adapted to be applied to the wind shield of an automobile or other vehicle to shield the eyes of the operator from the glaring rays of the sun, or from headlights of other vehicles at night.

The object of the invention is to provide a shade of the sort described which is of simple and inexpensive construction adapted to be mounted on the frame of the wind shield, or on rigid portions of the vehicle body adjacent the wind shield in such a way as to permit the ray-screen to be easily and quickly moved to any desired position across the wind shield to intercept any glaring rays that would otherwise annoy the operator and possibly interfere with the safe operation of the vehicle. A further object of the invention is to provide means whereby the ray-screen will be normally secured against movement on its support when adjusted to a desired position, and which at the same time will permit the ray-screen to be easily released for movement thereon either to a new operative position or to an inoperative position out of the line of vision of the operator or other occupant of the vehicle.

Other objects and advantages of my invention will be apparent from the following description of certain embodiments thereof, illustrated in the accompanying drawings, and the novel features of the invention will be particularly pointed out in the appended claims.

Figure 1:
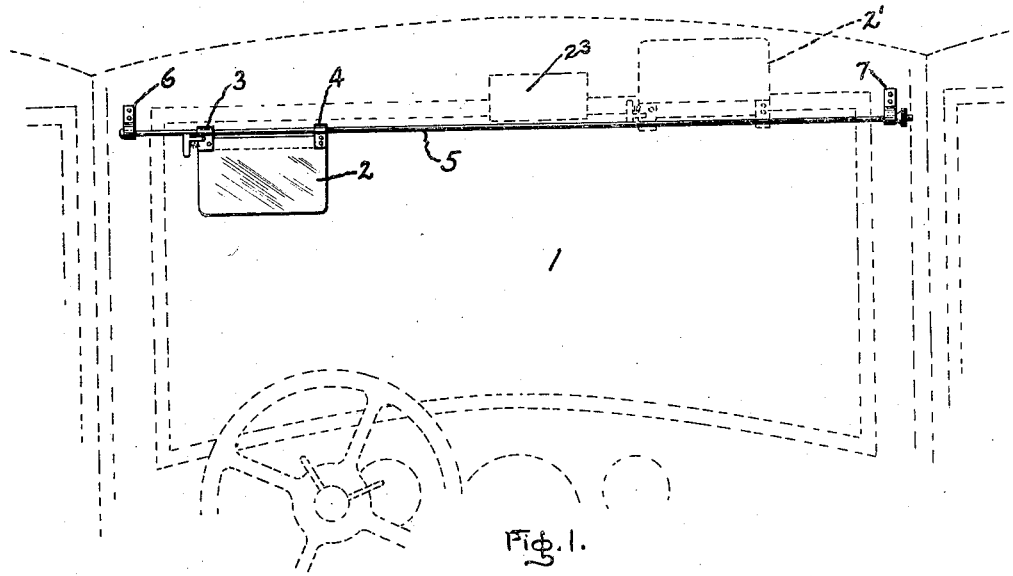
Figure 2:
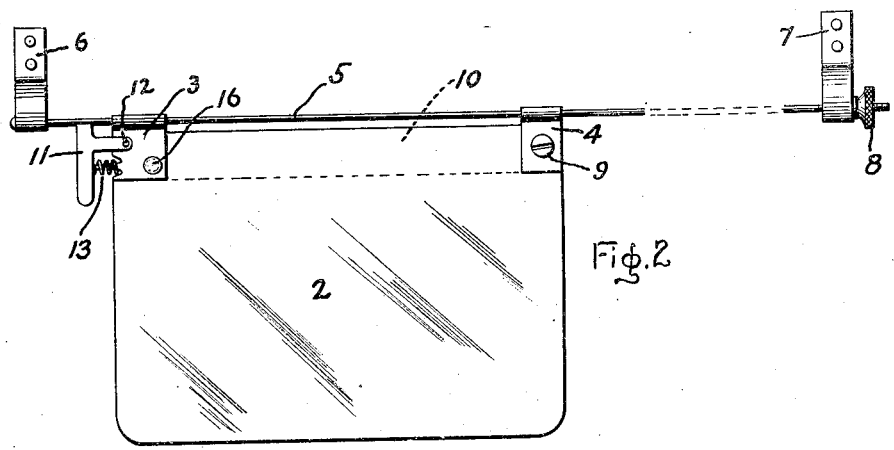
Figures 4, 5, 7:
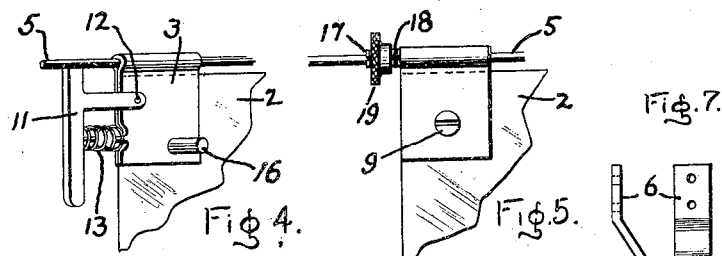
Figures 3, 6:
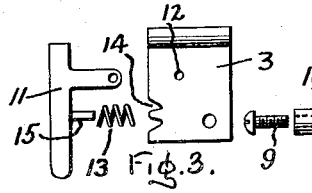

In the accompanying drawings, Fig. 1 shows my invention as applied to the wind shield of an inclosed automobile; Fig. 2 is an illustration on a somewhat larger scale of one embodiment of my invention; Fig. 3 shows, on a still larger scale, details of certain elements, while Fig. 4 shows the same elements assembled for use; Figs. 5 and 6 illustrate two modifications of certain elements of the invention, and Fig. 7 shows front and side views of a supporting bracket.

Referring now in detail to the drawings; there is shown in dotted lines in Fig. 1, a fragmentary interior view of an inclosed type of automobile, facing the wind shield which is indicated at 1, with the glare shade comprising my invention applied thereto, as shown in full lines. The glare shade (shown in larger scale in Fig. 2) includes a substantially rectangular ray-screen 2, which may be of translucent or semi-transparent material such as colored glass, but I prefer to use celluloid in view of its lighter weight.

The ray-screen 2, is slidably and rotatably mounted, preferably by means of suitable hinge members 3 and 4, on a supporting member 5, which may comprise a metal rod of small diameter, but which, as illustrated in the drawings, preferably comprises a length of wire, especially if the ray-screen is of light material such as celluloid. The supporting member 5, in turn, is supported by brackets 6 and 7 located adjacent the upper corners of the wind shield 1 and secured directly to the wind shield frame or, as illustrated in Fig. 1, on rigid portions of the automobile body such as the corner-posts.

In the event the supporting member 5 is of wire, as is the case in the arrangement illustrated, it is desirable to secure one end of the wire to one of the brackets, for example 6, and provide means, such as the nut 8 threaded upon the other end of the wire 5 and bearing against the bracket 7, for putting tension on the wire.

The hinge members 3 and 4, may be formed from strips of sheet metal, each of which is doubled over in such a way as to slidably fit on the rod or wire 5 and embrace between its ends the edge of the ray-screen 2, to which it is secured by suitable means such as screws 9. When the ray-screen is formed from flexible celluloid, it is desirable to provide a stay or stiffening member, such as a strip of sheet metal 10, which is attached to the ray-screen, along its upper margin between the hinge members 3 and 4, whereby the celluloid will be prevented from bending or buckling when lateral pressure is applied to one of the hinge members for the purpose of moving the ray-screen along its support 5. Preferably the stay 10 and the hinge members 3 and 4 may be integral and comprise one piece or punching of substantially U-shape in development.

Associated with the hinge member 3, is a latch member 11 adapted to engage the rod or wire 5 to secure the ray-screen in any desired position thereon, and which at the same time, may be readily released to permit a movement of the ray-screen to a new position. The latch 11 is shown in the drawings as having the form of a trigger comprising a vertical lever member, the upper end of which is adapted to engage the rod or wire 5, and an arm extending horizontally to one side intermediate the ends of the vertical member and pivotally secured at 12 to the hinge member 3. Interposed between the hinge 3 and the lower end of the vertical portion of latch 11 is means such as a spring 13 adapted to press the latch into position to engage the support 5; the spring 13 being supported in notches 14 in the edge of hinge 3 and on the pin 15 on the latch member.

For convenience in manipulating the latch a projection such as a stud 16 is suitably attached to the hinge 3, adjacent the lower end of the latch 11, whereby the latch may be released by gripping the stud and lower end of the latch member between the index finger and thumb of one hand, thus permitting of easy adjustment of the ray-screen along its support 5 by the operator of the vehicle while driving. The stud 16 may be secured to the hinge member by means of the screw 9 by which the hinge member is attached to the ray-screen.

In Fig. 5 is illustrated a different form of means for securing the ray-screen in position on its support 5. In this case the hinge member 3 is provided with a projection or hub 17 provided with radial slots 18, and on which is threaded a nut 19 which may be tapered interiorly to compress or clamp the split hub into locking relation with the rod or wire 5.

Fig. 6 shows a modification of the latching means shown in Figs. 2, 3 and 4, in which modification the spring member 13 is replaced by a stud 20 which is attached to the hinge 3 and projects laterally therefrom toward the lower end of the latch member 11, and a nut 21 threaded on the outer end thereof. The arrangement is such that the outer face of the nut 21, which normally overhangs the end of the stud 20, bears against a lug 22, provided on the lower portion of latch member 11, in such a way that movement of the nut 21 on the stud 20 serves to cause the upper end of latch 11 to frictionally engage the support 5 or to be released from such engagement.

As stated, the ray-screen 2 is so mounted on the supporting member 5, that it may be rotated thereon as well as be moved longitudinally of the supporting member. This permits the ray-screen to be turned upward to a position out of the line of vision of the operator or other occupant of the vehicle as indicated in dotted lines at 2' in Fig. 1.

It is frequently the cause of annoyance to an operator of an automobile when driving at night, that the rear-view mirror, with which automobiles are now generally equipped, reflects glaring rays from headlights of other vehicles approaching from the rear. One important advantage of my invention is that the supporting member 5 may be so located with reference to the mirror 23 that a ray-screen 2 supported thereon in the manner described, may be turned upward and adjusted to a position in front of the mirror where it will serve to mask the mirror and absorb objectionable rays. For this purpose a second ray-screen may, if desired, be mounted on the supporting member 5, which second ray-screen may be used during the day to protect the eyes of an occupant of the automobile, other than the operator, from the direct rays of the sun.

While I have described what I now regard as the most desirable embodiments of my invention, it is subject to still further modification and I desire to cover all such modifications as are within the scope of my invention.

What I claim as new and desire to secure by Letters Patent of the United States, is:

1. The combination with a wind shield of a glare shade comprising a ray-screen, a supporting member therefor horizontally disposed across the wind shield and on which the ray-screen is rotatably and slidably supported, and pivoted trigger means associated with the ray-screen adapted to releasably engage said supporting member to secure the ray-screen in any desired position along said supporting member.

2. The combination with a wind shield of a glare shade comprising a ray-screen, two brackets located adjacent the upper opposite corners of the wind shield, a supporting member for the ray-screen extending between said brackets and supported thereby, said ray-screen being rotatably and slidably mounted on said supporting member, a latch member pivotally attached to said ray-screen at one side thereof adapted to engage said supporting member, and means interposed between the ray-screen and said latch adapted to cause the latter to releasably engage said supporting member to secure the ray-screen in any desired position along said supporting member.

3. The combination with a wind shield of a glare shade comprising a ray-screen, two brackets located adjacent the upper opposite corners of the wind shield, a supporting member for the ray-screen extending between said brackets and supported thereby, a hinged member attached to the ray-screen and slidably mounted on said supporting member, a latch member pivotally mounted on said hinge member in position to engage the supporting member, and means interposed between said hinge member and said latch member adapted to cause the latter to releasably engage said supporting member to secure the ray-screen in any desired position along said supporting member.

4. The combination with a wind shield of a glare shade comprising a ray-screen, two brackets located adjacent the upper opposite corners of the wind shield, a supporting member for the ray-screen extending between said brackets and supported thereby, a hinge member attached to the ray-screen and slidably mounted on said supporting member, a latch member pivotally mounted on said hinge member in position to engage the supporting member, resilient means interposed between said hinge member and said latch member to cause the latter to normally engage said supporting member to secure the ray-screen in any desired position along said supporting member, and means associated with said hinge member adapted for use in cooperation with said resilient means for releasing said latch from engagement with said supporting member.

5. The combination with a wind shield of a glare shade comprising a ray-screen of flexible semi-transparent material, two brackets located adjacent the upper opposite corners of the wind shield, a supporting member for the ray-screen extending between said brackets and supported thereby, two hinged members attached to one edge of the ray-screen at opposite ends thereof, a stay or stiffening strip being fixed to said ray-screen between said hinge members, and means associated with one of said hinge members adapted to releasably engage said supporting member to secure the ray-screen in any desired position along said supporting member.

6. The combination with a wind shield of a glare shade comprising a ray-screen, two brackets located adjacent the upper opposite corners of the wind shield, a wire suspended between said brackets, means associated with one of said brackets for exerting tension on said wire, a hinge member attached to the ray-screen and slidably mounted on said wire, and means associated with said hinge member adapted to releasably engage said wire to secure the ray-screen in any desired position along said wire.

7. The combination with a wind shield of a glare shade comprising a ray-screen, two brackets located adjacent the upper opposite corners of the wind shield, a wire suspended between said brackets, means associated with one of said brackets for exerting tension on said wire, a hinge member attached to the ray-screen and slidably mounted on said wire, a latch member pivotally mounted on said hinge member in position to engage the wire, and means interposed between said hinge member and said latch member adapted to cause the latter to releasably engage said wire to secure the ray-screen in any desired position along said wire.

8. The combination with a wind shield of a glare shade comprising a ray-screen, two brackets located adjacent the upper opposite corners of the wind shield, a wire suspended between said brackets, means associated with one of said brackets for exerting tension on said wire, a hinge member attached to the ray-screen and slidably mounted on said wire, a latch member pivotally mounted on said hinge member in position to engage said wire, resilient means interposed between said hinge member and a portion of said latch member to cause the latter to normally engage said wire to secure said ray-screen in any desired position along said wire, and means associated with said hinge member adapted for use in cooperation with said resilient means for releasing said latch from engagement with said wire.

In witness whereof, I have hereunto set my hand this 4th day of January, 1928.

FRANCIS SMITH.